(12) United States Patent
Forestiere et al.

(10) Patent No.: US 6,278,029 B1
(45) Date of Patent: Aug. 21, 2001

(54) PROCESS FOR ELIMINATING POLAR COMPOUNDS ON AN ETHERIFICATION UNIT

(75) Inventors: Alain Forestiere, Vernaison; Quentin Debuisschert; Pierre Marache, both of Rueil-Malmaison; Paul Mikitenko, Noisy le Grand, all of (FR)

(73) Assignee: Institut Francais du Petrole (FR)

( * ) Notice: Subject to any disclaimer, the term of this patent is extended or adjusted under 35 U.S.C. 154(b) by 0 days.

(21) Appl. No.: 09/212,267

(22) Filed: Dec. 16, 1998

Related U.S. Application Data
(60) Provisional application No. 60/073,006, filed on Jan. 29, 1998.

(30) Foreign Application Priority Data

Dec. 17, 1997 (FR) .................................................. 97 16035

(51) Int. Cl.[7] .......................... C07C 41/34; C07C 41/00; C07C 7/00
(52) U.S. Cl. .......................... 568/699; 568/579; 568/697; 585/800; 585/833; 585/867
(58) Field of Search .................... 568/699, 579, 568/697; 585/800, 833, 867

(56) References Cited

U.S. PATENT DOCUMENTS

| | | |
|---|---|---|
| 4,808,765 | 2/1989 | Pearce et al. . |
| 5,271,835 * | 12/1993 | Gorawara et al. .................. 208/228 |
| 5,569,788 | 10/1996 | Forte et al. . |
| 5,569,790 * | 10/1996 | Frey et al. ............................. 568/699 |
| 5,672,772 * | 9/1997 | Frey et al. ............................. 568/699 |
| 5,684,212 * | 11/1997 | Patton et al. ......................... 568/697 |

* cited by examiner

*Primary Examiner*—Johann Richter
(74) *Attorney, Agent, or Firm*—Millen, White, Zelano & Branigan, P.C.

(57) ABSTRACT

A process for eliminating at least pollutants including polar compounds present in a first fluid, with said first fluid sent to a subsequent treatment, e.g., an etherification process:

a) the first fluid containing pollutants is contacted with an auxiliary fluid such as a vapor phase, under operating conditions that are selected so as to obtain, at the end of this first stage, said first fluid that is purified and freed of, for the most part, pollutants, and a vapor phase that is loaded with pollutants, said vapor phase being produced during one phase of the process, and b) at least a portion of said first purified fluid is recycled to a subsequent treatment stage.

18 Claims, 2 Drawing Sheets

PROCESS FOR ELIMINATING POLAR COMPOUNDS ON AN ETHERIFICATION UNIT

This application claims the benefit of the filing date of U.S. Provisional Application Ser. No. 60/073,006 filed Jan. 29, 1998.

This invention relates to a process that makes it possible to eliminate pollutants, particularly traces of polar compounds, which are contained in a fluid, by bringing it into contact with a vapor phase produced during the process or consecutively with a vapor phase and then possibly solid phase.

The expression "polar compounds" pertains in particular to nitrites and acetone.

Likewise, the term "nitriles" combines compounds that contain nitrogen, such as acetonitrile, propionitrile and any mixtures of them.

The invention is readily incorporated into etherification processes. Actually, in such processes, it is necessary to wash the hydrocarbon feedstock with water before sending it to the reaction zone. The washing water, which is loaded with pollutants, can be purified by using the process according to the invention.

In the description below, the word "washing" applies to devices and processes that make it possible to wash a second fluid with a first fluid, before sending said second washed fluid to a subsequent treatment process that is sensitive to said pollutants, which can be, for example, an etherification reaction by acid catalysis. The word "purification" is used to refer to operations for treating the first fluid that is loaded with pollutants.

The word "feedstock" represents the fluid which will be subjected to treatment. For the etherification process, the expression "hydrocarbon feedstock" will be used.

Etherification processes are commonly used to increase the octane number of gasolines. These units typically treat olefinic $C_4$–$C_5$ fractions or light gasoline fractions that contain tertiary olefins such as isobutenes, isoamylenes, isohexenes, isoheptenes, which can react easily with alcohols, for example, methanol, to provide methyl or ethyl ethers.

The processes for etherification can also be used intermediately to extract pure isoolefins from hydrocarbon fractions that contain them. In this case, ether is produced by the etherification reaction, and then catalyzed decomposition of ether that is purified and thus pre-isolated is carried out. For example, pure isobutylene can be obtained for the production of polyisobutylene, tert-butyl-phenol and does so by decomposition of methyl-tert-butyl-ether (MTBE).

The process for the production of MTBE is the most widely used etherification process. The treated hydrocarbon feedstock, a $C_4$ fraction in this case, contains olefins in general and isobutene in particular. Like other processes for etherification which are of general importance and which have been incorporated into large-scale industrial applications, there is the production of tert-amyl-methyl ether (TAME) by reaction of isoolefins that contain 5 carbon atoms with methanol and the production of ethyl-tert-butyl ether (ETBE) that is obtained by reacting isobutene that is contained in a $C_4$ fraction with ethanol.

In general, all these reactions are carried out in the presence of acid catalysts, for example, and the most common industrial case is ion-exchange resins such as crosslinked sulfonic polystyrene resins in acid form.

When polar compounds, such as nitrites or ketones, are present in the hydrocarbon feedstock of these etherification processes, they react with the catalyst, which causes the catalyst to lose its properties and to be deactivated.

To increase the life of the catalysts, it is known in the prior art to wash the hydrocarbon feedstock before it passes to the catalyst, generally with demineralized water. For example, before being introduced into the reactor where the etherification reaction will be carried out, a standard operation involves circulating countercurrently in a washing column the hydrocarbon feedstock and washing water under established operating conditions so that the water for washing is loaded with pollutants. At the end of this operation, for the most part, the compounds that are likely to poison the catalyst and therefore limit its life are removed from the hydrocarbon feedstock. The washing water that is loaded with pollutants is sent to a general circuit for treating water from a refinery including an etherification unit.

This washing water, which contains the pollutants that are removed from the hydrocarbon feedstock in addition to small amounts of hydrocarbons, is then treated by physico-chemical and/or bacteriological processes to make it possible to dump all of it, if necessary, to a sewer system, whereby it is not possible to envisage any recycling to the washing unit that is located upstream from the etherification unit from which it comes. This approach requires the use of a large amount of water that is of high purity and is supplied from an outside source.

According to U.S. Pat. No. 5,569,790, the purification of the hydrocarbon feedstock washing water that contains the pollutants is accomplished by bringing it into liquid-liquid contact at least partially with a portion of the final effluent raffinate that comes from the etherification unit. The purified water is then recycled into the washing column of the feedstock. While such a process offers in particular the recycling of water as an advantage, it still suffers from the drawback of polluting the raffinate by loading it with pollutants or nitrites. This is not recommended; the raffinate may be intended for other treatment processes downstream, such as an alkylation process. Moreover, the degree of purification of the water is necessarily limited, on the one hand because the splitting of the pollutants is done in favor of the aqueous phase, as the washing of hydrocarbons shows, and, on the other hand, because the proportion of raffinate relative to the water that is loaded with pollutants is imposed by the process and cannot be increased. The result is that the recycled water is then impure, which reduces the effectiveness of the washing of the hydrocarbons. To increase the effectiveness of the washing, it is then necessary to inject water from the outside in relatively large amounts. Such an operation will, however, run counter to the need to conserve water or will have to operate in an almost closed loop when the available outside sources of water are not very numerous. In addition to a given effectiveness of washing, the overall flow rate of washing water to the washing column is larger than that which is used in processes that operate with lost water (outside source).

The technical teaching contained in the U.S. Pat. No. 5,684,212 relates to an improvement of a process of etherification which comprises a stage where the water that is loaded with pollutants while washing the hydrocarbon feedstock is brought into contact with a first vapor flow or a fuel gas flow under conditions which makes it possible to eliminate nitrites from water charged in pollutants.

The vapor flow or the fuel gas flow are supplied from outside source. Such a process presents in particular the disadvantage of having to have external sources which are not always available.

One of the objects of this invention is to use a vapor phase under given operating conditions to pick up such pollutants as polar compounds and more particularly nitrites (acetonitrile, propionitrile, . . . ) and acetone, which are contained in water for washing hydrocarbon feedstock that is intended for, for example, an etherification reaction.

The idea involves carrying out a process in 1 closed or quasi closed loop in which the phase vapor used for collecting of the pollutants is produced during the process.

The vapor phase can be produced by the fluid that is loaded with pollutants itself or else come from an outside source. For example, it is possible to use the water vapor that is generated by the reboiler of a stripping column to eliminate pollutants from the washing water.

Without exceeding the scope of the invention, the process according to the invention can be used to purify a first fluid which has been used to "wash" a second fluid, to eliminate pollutants that are contained in this second fluid, with the latter being intended for a subsequent treatment. As an example that is in no way limiting, it is possible to cite the washing water (first fluid) of a hydrocarbon feedstock (second fluid) that is intended for an etherification unit.

It has also been discovered that it is possible to carry out and/or enhance the purification of the fluid that is loaded with pollutants by running it over a solid phase that is selected for retaining the pollutants (polar compounds and optionally hydrocarbons).

This invention relates to a process for eliminating at least pollutants, such as polar compounds that are present in a first fluid, with said first fluid that flows out being intended to be sent to a subsequent treatment stage.

The process is characterized in that it includes the following stages:
a) the first fluid that is loaded with pollutants is brought into contact with a vapor phase, under operating conditions that are selected so as to obtain, at the end of this first stage, said first fluid that is purified and freed of, for the most part, pollutants, and a vapor phase that is loaded with pollutants, said vapor phase being produced during the step a) of contact, and
b) at least a portion of said first purified fluid is recycled to a subsequent treatment stage.

For example, said vapor phase is produced during the stage a) of contact, with reboiler.

It is possible to introduce the first fluid into a purification column and it is possible to circulate in countercurrent a vapor phase that comes from a reboiler that is coupled to said column.

For example, the vapor phase that is loaded with pollutants and emerges from contact stage a) is sent to a stage for condensation and separation, at the end of which an essentially aqueous phase and a liquid phase comprising essentially hydrocarbons are obtained.

For example, a gas phase comprising hydrocarbons and fraction of pollutants, is obtained, said gas phase being sent to an elimination stage.

At least one part of the essentially aqueous phase is recycled, for example, so as to be used as reflux in the contact stage a).

For example, at least one portion of the aqueous phase is drained off.

At least one fraction of said purified first fluid is, for example, used to heat said first fluid to be purified.

It is possible to carry out the stage a) in a temperature range of between 60 and 210° C. and a pressure range that varies between 0.02 MPa end 2 MPa, absolute.

During stage a), dilute base or an acid is, for example injected to keep the pH in an essentially neutral range.

The first purified fluid is sent, for example, at the end of stage a) to an additional treatment stage where it is brought into contact with a solid phase that is able to retain pollutants.

This invention relates also to a process for etherification of a hydrocarbon feedstock. The process can include in combination at least the following stages:
a) a feedstock that contains hydrocarbons with 3 to 8 carbon atoms and pollutants such as polar compounds is brought into contact with recycled washing water to obtain a hydrocarbon feedstock that is almost free of the majority of said pollutants and washing water that is loaded with pollutants,
b) said hydrocarbon feedstock that is almost free of pollutants is sent to an etherification unit,
c) the washing water that is loaded with pollutants is sent to treatment stages where it is
  1) purified by being brought into contact with a vapor phase to obtain a vapor phase that is loaded with pollutants and purified washing water, said vapor phase being produced during stage c)1),
  2) purified washing water that is obtained at the end of stage 1) is recycled to the washing stage of the hydrocarbon feedstock, and
  3) the vapor phase that is loaded with pollutants is evacuated.

It is possible to carry out stage a) in a liquid—liquid extraction column and/or stage c)1) is carried out in a distillation column.

Stages a) and/or c)1) can be carried out by countercurrent circulation.

For example washing water that is loaded with pollutants is sent to a separation stage before stage c)1) for eliminating at least one part of lighter hydrocarbons.

At least one portion of the hydrocarbon feedstock that is free of pollutants (stage b)) is used as a coolant and/or a warm fluid from a stage of the etherification process at the reboiler of the purification column is used.

Relative to the prior art, the process according to the invention offers in particular the following advantages:
  it makes it possible to operate in an almost-closed loop, between a washing column of a hydrocarbon feedstock before a treatment unit that uses washing water and a column for purification of the washing water that is loaded with pollutants; thus, great flexibility is achieved with regard to the flow rate of washing water, and it is therefore possible to increase the degree of pollutant removal,
  the addition and removal of washing water to and from the closed loop are very small, compared to a conventional washing process with loses of water in the prior art,
  the degree of purification is high, whereby it is possible to directly recycle the purified water to the washing column; at least 60% of the polar compounds that are present in the hydrocarbon feedstock will be eliminated, depending on the recycled water flow that is used and the nature of the compounds.

Other advantages and characteristics according to the invention will be better understood from reading the description of an example of application of the process according to the invention, which is provided by way of illustration and is in no way limiting for the purification of the washing water of a hydrocarbon feedstock before it is treated in an etherification unit.

The hydrocarbon feedstock can contain hydrocarbons of 3 to 8 carbon atoms, for example, typically $C_4$, $C_5$ but also $C_6$, $C_7$, $C_8$ and such pollutants as the polar compounds that were cited above (nitrites, acetones).

The hydrocarbon feedstock that has to be washed of the pollutants that it contains is sent via a pipe 1 to the bottom of a washing column 2. Inside of this washing column 2, it is brought into contact, for example, in countercurrently, with washing water that is introduced, for example, at the top of the column via a pipe 3. The operating conditions of this washing operation, in particular pressure P and temperature T, are selected to ensure the extraction of polar compounds and/or compounds that are soluble in water by the washing water and to obtain a hydrocarbon feedstock that is freed of at least the majority of pollutants.

The hydrocarbon feedstock that is purified of pollutants is evacuated via a pipe 4 to the top of the washing column and is sent to, for example, a treatment unit $U_1$. An example of the treatment unit (part II), for example, an etherification unit, is given briefly in FIG. 2.

The washing water which is loaded with pollutants is removed at the bottom of washing column 2 via a pipe 5 and is sent to a circuit for treatment or purification (part III of the figure). At the level of this circuit, it is regenerated by implementing the stages of the process according to the invention, before being recycled to washing column 2.

A line 3b makes it possible to introduce an input of water into washing column 2 of the hydrocarbon feedstock.

Figure 1:
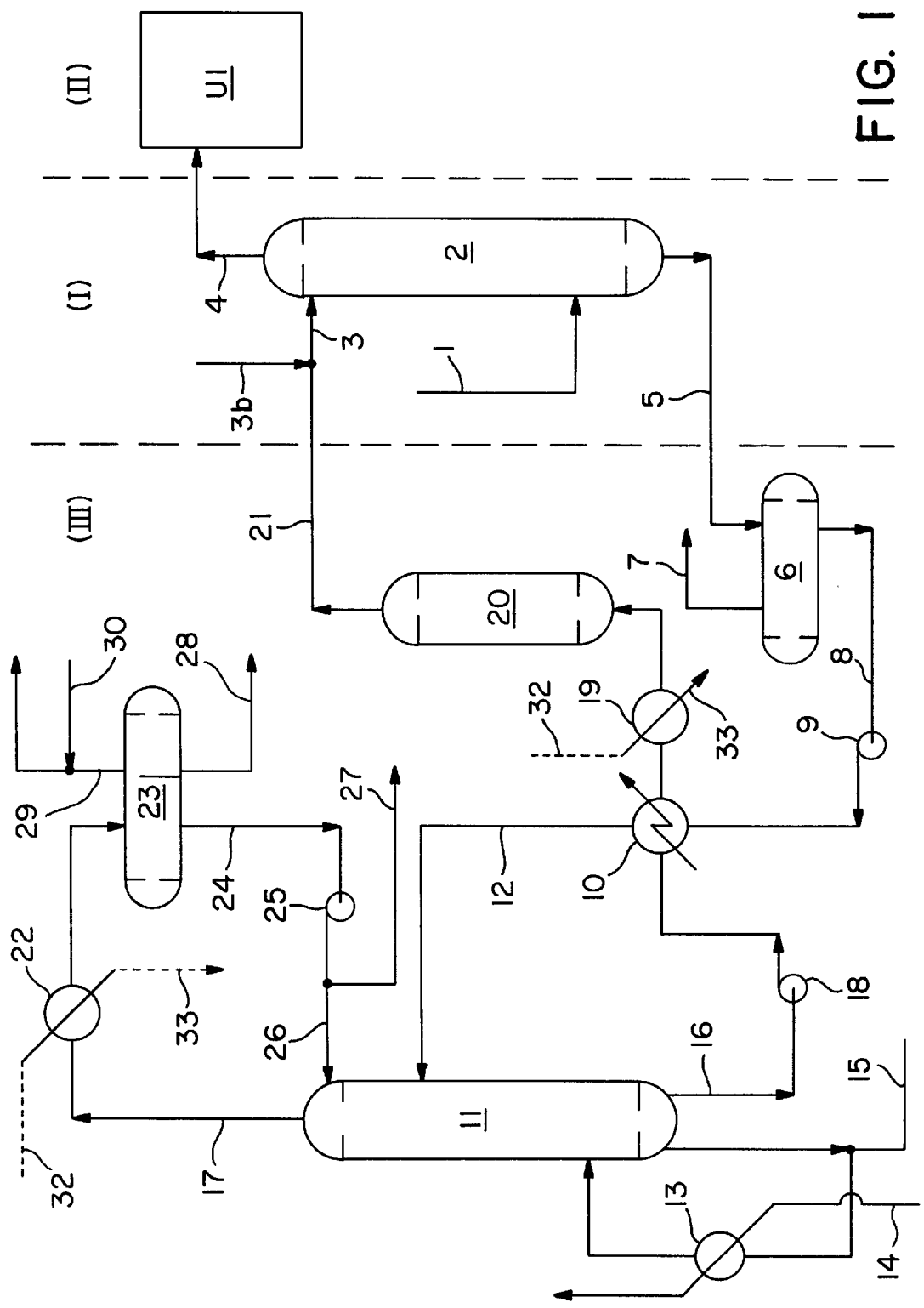
FIG. 1 shows a diagram or a purification circuit for the feedstock washing water.

Part III of FIG. 1 shows a diagram of a sample embodiment for the circuit for purifying the washing water that is loaded with pollutants and that comes from washing column 2.

The washing water that is loaded with polar compounds is sent through a pipe 5 of washing column 2 to a buffer flask 6. A portion of the lightest hydrocarbons is evacuated from the flask via a pipe 7, and the remainder of the washing water that is loaded with polar compounds and has little of the lightest hydrocarbons is evacuated at the bottom of buffer flask 6 via a pipe 8. The water that is loaded with pollutants is sent by means of a pump 9, and after passing into a heat exchanger 10, to a purification column 11. It is introduced at, for example, the top of purification column 11, via a pipe 12.

Depending on the respective pressure levels of columns 2 and 11, it is possible to send the washing water directly from the bottom of column 2 to the purification column without using the buffer flask or the pump.

In its lower part, said purification column 11 is provided with a reboiler 13 whose function is in particular to initiate a vapor flow, by partial vaporization of liquid. A fluid that has a high enough temperature to partially vaporize the liquid from the bottom of the column feeds reboiler 13 via a line 14. The pH of the liquid of the bottom of the column can be controlled by automatically supplying dilute acid or base, which is added via a pipe 15.

The washing water that is purified for the most part of pollutants is extracted at the bottom of purification column 11 via a pipe 16, and the vapor phase which is loaded with pollutants (nitrites, acetone and/or optionally hydrocarbons) during countercurrent circulation is evacuated at the top of the column via a pipe 17.

The purified water that is extracted by pipe 16 is picked up via a pump 18 and sent to heat exchanger 10, where it exchanges calories to reheat the washing water that is loaded with pollutants that come from flask 6. The purified water is then cooled in an exchanger 19 before optionally being introduced into a device 20 that makes it possible to purify it further.

The purified water that comes from device 20 is extracted via a pipe 21 and is recycled to pipe 3 for introducing the washing water into column 2 for washing the hydrocarbon feedstock.

Device 20 can be a chamber that contains a solid phase, for example, activated carbon, a resin or else an adsorbent, which offers as a particular feature the retention of residual pollutants.

The vapor phase that is loaded with pollutants and that is evacuated via pipe 17 is sent, via a condenser 22, to a flask 23 in which it is separated into at least three effluents:

A phase that is basically aqueous and that contains a portion of the pollutants is evacuated via a pipe 24 at the bottom of flask 23. This phase is picked up via a pump 25. A first portion of this aqueous phase is sent via a pipe 26 to be used for reflux in purification column 11, whereas a second portion is sent to a drain line 27 to eliminate any excess water and a portion of the pollutants.

A phase that consists basically of hydrocarbons is evacuated from flask 23 via a pipe 28. This phase can be picked up via a discontinuous pump, not shown in the Figure, and sent, for example, to be used with the hydrocarbon feedstock before washing.

A gaseous phase or gaseous drain that contains hydrocarbons and pollutants that is evacuated at the top of the flask via a pipe 29.

In the case where there is no gaseous drain, a pipe 30 that is connected to pipe 29 makes it possible to introduce a certain amount of nitrogen to maintain a given pressure inside flask 23. This manner of proceeding offers in particular following advantages:

the condensation of head vapor makes it possible to strongly decrease water losses, and thus reduces the water supplementation necessary, decreasing the loss of hydrocarbons dissolved in the water of washing by recovering them and possibly recycling them, the separation of the gas phase makes it possible to eliminate the pollutants with a torch directly, and thus to decrease the water treatment of polluted material.

Without exceeding the scope of the invention, the purification stage can be carried out using a gas or a vapor that is different from the vapor phase that is produced by the reboiler. In the case where it is desired to purify water that is loaded with pollutants, it will be possible to use the water vapor that is introduced at the bottom of column 11. This fluid can then also be used as a feed in the recycling circuit.

The temperature and pressure conditions that are maintained in purification column 11 are selected such as to make it possible to entrain at least most of the pollutants by water vapor.

Thus, the temperature at which the procedure is carried out is between 60° C. and 210° C., and the pressure varies between 0.02 and 2 MPa, absolute.

According to an advantageous implementation of the process, the pH is controlled at the bottom of purification column 11 by injecting a dilute base or acid, in order to keep it in a neutral range that varies, for example, between 6.5 and 7.5. In this way, the effect of undesirable phenomena, such as the corrosion of equipment, is limited.

The extent to which the pollutants of the washing water are eliminated by using the process varies from 85% to 100%.

Since the purity of the purified water is high, it is possible to recycle it to the washing stage of the hydrocarbon feedstock without any other major purification stage. It is also possible to enhance this purification stage by running the material over the solid phase of device 20.

Operating this way in an almost-closed loop between column 2 for washing the feedstock and purification column 11 ensures great flexibility with regard to the flow rate of washing water. This flexibility makes it possible to optimize the elimination of the pollutants from the hydrocarbon feedstock at the level of the washing column.

It is thus possible to eliminate at least 60% of the polar compounds that are present in the hydrocarbon feedstock (second fluid), whereby the degree of elimination for a given flow rate of this feedstock is based on the flow rate of recycled water and the nature of the pollutants.

Advantageously, for purification column 11, the degree of reflux relative to the feedstock is between 2 and 20%.

The drain flow via line 27 represents on the order of 0.1 to 5% of the washing water that is to be treated and contains the has the advantage that it involves dumping less pollutant-laden water than do the processes of the prior art.

The optional supply of water will therefore be very low and can vary from, for example, 0.1 to 5%.

To limit the consumption of utilities (condenser, heat exchangers, . . . ), the procedure will be carried out with, for example, thermal integration. Thermal integration is defined as the possibility of using hot or cold fluids that come from a treatment unit with which the process according to the invention is associated, to be used as a heating agent in the reboiler or as a coolant for condenser 22 and/or cooling exchanger 19.

An example of the process according to the invention that is arranged upstream from an etherification unit, taking into account the possibility of limiting consumption, is provided below.

EXAMPLES

Reducing the Consumption of the Utilities of an Etherification Unit

Figure 2:
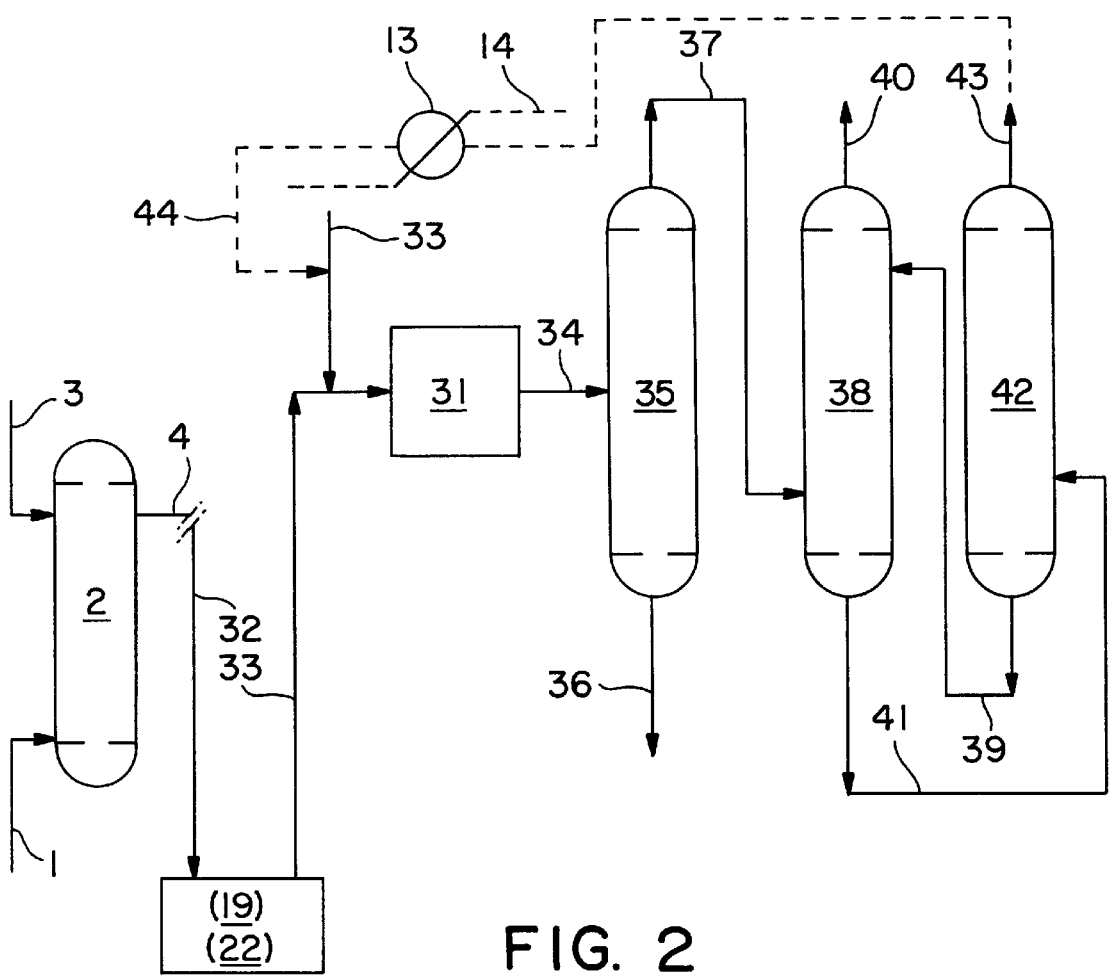
FIG. 2 shows an example of application of the circuit of FIG. 1 upstream from an etherification unit.

FIG. 2 shows a diagram of an example of an etherification unit that is placed after a purification circuit as shown in FIG. 1. For the sake of clarity and simplicity, only the material flows have been shown in the diagram; the valves, exchangers, drain line, pumps, . . . have not been shown.

Purification of the Washing Water of the Hydrocarbon Feedstock According to the Process of Purification Data that is Specific to the Etherification Unit The hydrocarbon feedstock that initially contains the pollutants consists of, for example, monoolefins and paraffins, with each containing from 3 to 8 carbon atoms, typically $C_4$, $C_5$, but also $C_6$, $C_7$, $C_8$ in most cases in an amount that is larger than that of the monoolefins. The paraffins can include butane, propane, isobutane, isopentane or n-pentane, and hexanes (iso or n-).

The monoolefins can include propylene, butene-1, butene-2, isobutene, 2-methyl-2-butene, 2-methyl-1-butene, 3-methyl-1-butene, 1-pentene, 2-pentene, cyclopentene and cyclohexene. This feedstock can also contain, in small amounts, diolefins such as 1,3-butadiene and 1,3-pentadiene, isopropene, and cyclonentadiene.

The pollutants or polar compounds, in particular nitriles (defined at the beginning of the description), are present in the feedstock in the form of traces in proportions that vary between 10 and 500 ppm/by weight and more particularly in the range of 15 to 80 ppm-by weight. The feedstock can also contain water in a variable amount of between 5 and 500 ppm-by weight that is measured in $H_2O$ at saturation. The pollutants may also include oxidized compounds such as alcohols, ethers, aldehydes, ketones, and acids. As more specific examples of these compounds, it is possible to mention ethanol, methanol, acetone . . .

Acetone may be present in the form of traces that vary within the range of 1 to 500 ppm-by weight. The feedstock may or may not have been subjected to a selective hydrogenation process to eliminate the diolefins before or after treatment. Typically, the feedstock can contain between 50 ppm-by weight and about 4% by weight of diolefins.

Operating Conditions of the Etherification Process

The temperature range for carrying out the etherification operation is from, for example, 20 to 400° C., and the pressure range is between atmospheric pressure and 1 MPa. The stoichiometric molar ratios of the alcohol to the reactive isoolefins vary in a range that goes from, for example, 0.2:1 to about 10:1 and preferably between 0.95 and 1.15. These conditions will be selected based on the catalyst of the reaction zone.

Diagram of the Etherification Unit

Etherification unit $U_1$ includes a reaction zone 31 that is equipped with a pipe 33 for introducing the supply alcohol such as methanol that is necessary for etherification, an intake pipe 32 for the washed hydrocarbon feedstock that comes from washing column 2, and optionally a pipe 44 for recycling the alcohol.

First of all, the washed hydrocarbon feedstock is reheated by running it through condenser 22 or exchanger 19 (FIG. 1), for which it acts as a coolant. The reaction zone contains a catalyst that is selected to carry out the etherification reaction and operates under conditions such that at the output a mixture which is formed by unconverted $C_4$ and methanol is obtained and the ether that is produced during the reaction is sent via a pipe 34 to a distillation column 35.

At the bottom of distillation column 35, a flow that contains the ether that is produced is evacuated via a pipe 36.

At the top of the column, the hydrocarbons and the methanol that have not reacted are extracted via a pipe 37, and they are sent to a column 38 for washing the raffinate. Raffinate washing column 38 is equipped with a pipe 39 that makes it possible to introduce the washing water of the raffinate. A raffinate that is freed of methanol is evacuated via a pipe 40 at the top of column 38, and, at the bottom, a solution that is made up of water and methanol is evacuated via a pipe 41.

This solution is sent to a distillation column 42. At the bottom of distillation column 42, the water is evacuated via pipe 39 before being recycled to column 38 of the raffinate washing. At the top of distillation column 42, methanol in vapor form is extracted via a pipe 43. The latter can be sent to act as heating means, before being recycled to reaction zone 31. For this purpose, the methanol that is extracted via pipe 43 passes into pipe 14 of reboiler 13 (FIG. 1). After having transferred a portion of its heat to initiate the vapor flow that is necessary to operate purification column 11 (FIG. 1), the cooled methanol is recycled via pipe 44 to reaction zone 31. It is possible to adjust the pressure at the level of distillation column 42 to obtain methanol that has a temperature sufficient to allow it to act as a heating agent.

The numerical example that is provided below makes it possible to illustrate the advantages that are offered by the process according to the invention for purifying the feedstock washing water.

The washing water that is loaded with pollutants is extracted from the washing column of the hydrocarbon feedstock with a flow rate that can represent on the order of 5 to 150% of the hydrocarbon feedstock, depending on the nature of the pollutants of this feedstock and their content.

The water that is introduced into flask 6 contains as main pollutants:

dissolved hydrocarbons: 200 to 500 ppm by weight, nitrites of 10 to 300 ppm by weight and acetone of 10 to 300 ppm by weight.

At the top of flask 6, the flow rate of gas that consists of the lightest hydrocarbons varies from 0 to 0.005% of the flow rate of washing water to be purified.

At the bottom of purification column 11, the purified extracted water has pollutants whose contents are provided below:

dissolved hydrocarbons<at 10 ppm, nitrites<at 3 ppm and acetone<at 3 ppm.

At the top of the purification column, the vapor phase that is loaded with pollutants is evacuated with a flow rate that can be up to 0.05% by weight of the flow rate of washing water to be purified that enters the purification column.

The flow rate of the liquid distillate that is evacuated via pipe 28 is between 0 and 0.05% by weight of the flow rate of washing water that enters the purification column.

Drain line 27 evacuates an amount of water with a flow rate that varies from 0 to 5% of the flow rate of washing water to be purified and that has a content of pollutants that are divided as follows:

dissolved hydrocarbons of 200 to 500 ppm by weight, nitrites that vary between 0.1% and 10% by weight and acetone between 0.1 to 6% by weight.

Variant Embodiments

Without exceeding the scope of the invention, the process according to the invention can be used to wash a $C_4$–$C_6$ fraction that is to be sent into an oligomerization unit, or else to wash a $C_4$ fraction before it is treated in a methathesis unit.

The entire disclosure of all applications, patents and publications, cited above and below, and of corresponding French application No. 97/16.035, filed Dec. 17, 1997, and provisional application Ser. No. 60/073,006, filed Jan. 29, 1998, is hereby incorporated by reference.

What is claimed is:

1. A process for eliminating pollutants including polar compounds that are present in a first fluid, comprising:
    a) contacting a first fluid that is loaded with pollutants with a first vapor phase produced from vaporizing said first fluid loaded with pollutants, under operating conditions that are selected so as to obtain a purified first fluid that is reduced in pollutants, and a second vapor phase that is loaded with pollutants, and
    b) recycling at least a portion of said first purified fluid to a subsequent treatment stage.

2. The process according to claim 1 wherein during a) said first vapor phase is produced via a reboiler.

3. The process according to claim 1 wherein said first fluid is introduced into a purification column and the first vapor phase is produced from a reboiler that is coupled to said column and is circulated countercurrently to said first fluid loaded with pollutants.

4. The process according claim 1 wherein, said second vapor phase that is loaded with pollutants from a) is condensed and separated to produce an essentially aqueous phase and a liquid phase comprising hydrocarbons.

5. The process according to claim 4 wherein a gas phase comprising hydrocarbons and fraction of pollutants is obtained, said gas phase being sent to an elimination stage.

6. The process according to claim 4 wherein at least one part of the essentially aqueous phase is recycled to a) and refluxed with said first fluid.

7. The process according to claim 4 wherein at least a portion of the aqueous phase is drained off.

8. The process according to claim 1 wherein at least a fraction of said purified first fluid is used to heat said first fluid loaded with pollutants.

9. The process according to claim 1, wherein a) is operated at a temperature of 60 to 210° C. and a pressure of 0.02 MPa to 2 MPa, absolute.

10. The process according to claim 1, wherein during a), dilute base or an acid is injected to keep the pH in an essentially neutral range.

11. The process according to claim 1 wherein the purified first fluid is sent at the end of a) to an additional treatment stage where it is brought into contact with a solid phase that is able to retain pollutants.

12. A process for etherification of a hydrocarbon feedstock, comprising:
    a) contacting a feedstock that contains hydrocarbons with 3 to 8 carbon atoms and pollutants including polar compounds with recycled washing water to obtain a hydrocarbon feedstock that is almost free of the majority of said pollutants and washing water that is loaded with pollutants,
    b) sending said hydrocarbon feedstock that is almost free of pollutants to an etherification unit,
    c) sending the washing water that is loaded with pollutants to treatment where it is
        1) purified by being brought into contact with a first vapor phase to obtain a second vapor phase that is loaded with pollutants and purified washing water, said first vapor phase being produced during c)1) by vaporizing said washing water loaded with pollutants,
        2) purified washing water that is obtained at the end of 1) is recycled to wash the hydrocarbon feedstock, and
        3) the second vapor phase that is loaded with pollutants is evacuated.

13. The process for etherification according to claim 12, wherein a) is carried out in a liquid-liquid extraction column and/or c)1) is carried out in a distillation column.

14. The process for etherification according to claim 12, wherein a) and/or c)1) are carried out by countercurrent circulation.

15. The process for etherification according to claim 12, wherein said washing water that is loaded with pollutants is sent to separation before stage c)1) to eliminate at least a portion of lighter hydrocarbons.

16. The process for etherification according to claim 12, wherein at least a portion of the hydrocarbon feedstock that is free of pollutants is used as a coolant.

17. A process for eliminating pollutants including polar compounds in a fluid containing pollutants, comprising contacting said fluid with a vapor phase produced from vaporizing said fluid containing pollutants.

18. The process for etherification according to claim 12, wherein a warm fluid from the etherification process is used in a reboiler heating the purification in c)1).

* * * * *